July 4, 1950 V. W. FLEMING 2,513,466
GRAIN PICKUP MACHINE
Filed April 7, 1947
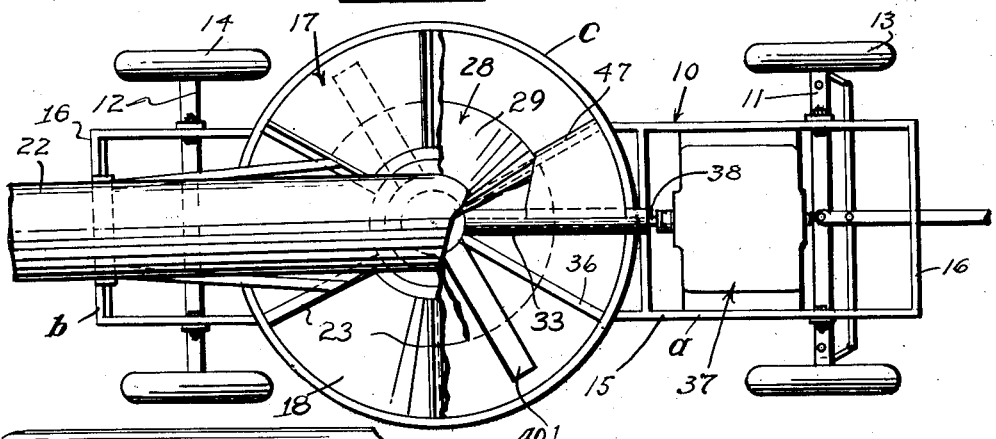
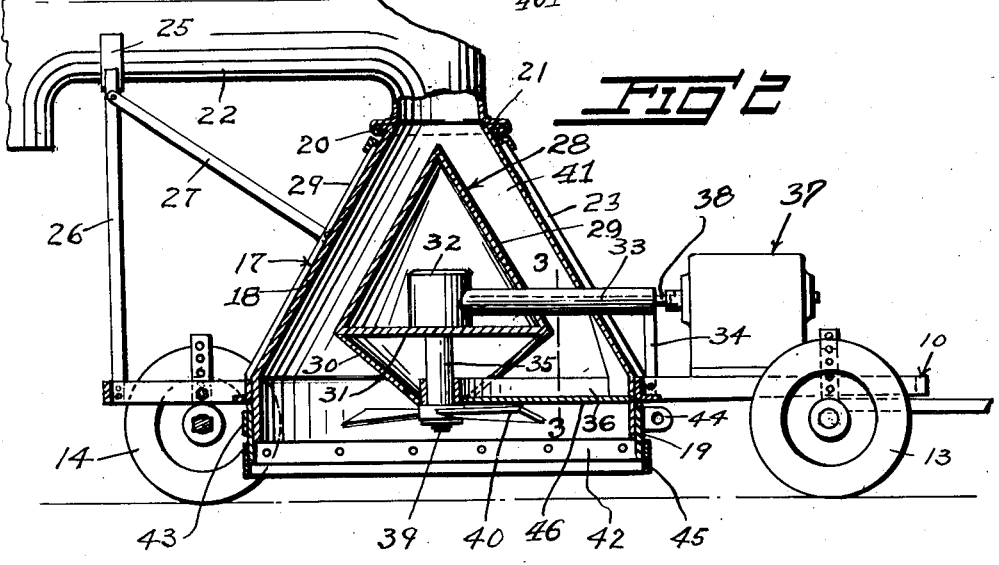
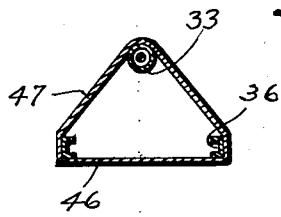
Inventor
*Vernon W. Fleming*
By *Wilfred E. Lawson*
Attorney Patented July 4, 1950

2,513,466

UNITED STATES PATENT OFFICE 2,513,466

GRAIN PICKUP MACHINE

Vernon W. Fleming, Sun River, Mont.

Application April 7, 1947, Serial No. 739,817

6 Claims. (Cl. 56—19)

This invention relates generally to farm machinery and is directed particularly to a machine or apparatus for picking up grain from a field.

A principal object of the invention is to provide a machine which, operating by suction, will pick up from a grain field grain heads or grain damaged by grasshoppers or wind or grain lying on the ground, and carry the same through a suitable conduit to a receiver, thereby making it possible to salvage grain which would otherwise be lost.

Another object of the invention is to provide a machine of the character stated having a hollow conical body, the base portion of which is open, with a pipe or carry off conduit connected with the apex, and a wheeled frame for supporting the body with the hollow base portion in close proximity to the ground and means within the body for creating a strong upward air current whereby the light grain heads will be readily picked up from the surface of the ground and carried upwardly for discharge through the conduit leading from the apex of the body, such conduit leading to a suitable receiver.

A still further object of the invention is to provide a machine of the character stated wherein there is provided an adjustable skirt depending from the open lower part of the conical body whereby the lower part of such body can, in effect, be raised or lowered with respect to the ground.

The invention will be best understood from a consideration of the following detailed description taken in connection with the accompanying drawing forming a part of the specification, with the understanding, however, that the invention is not to be understood as limited to the exact details of construction shown and described since obvious modifications will occur to a person skilled in the art.

In the drawing:

Figure 1 is a view in top plan of a machine constructed in accordance with the present invention with parts thereof broken away.

Figure 2 is a view partly in vertical longitudinal section and partly in elevation of the same, the line of section for the sectioned parts being designated 2—2 in Figure 1.

Figure 3 is a detail section taken substantially on the line 3—3 of Figure 2.

Referring now more particularly to the drawing the numeral 10 generally designates a carriage frame or body structure upon which the present invention is mounted to facilitate its movement over the ground. Such body frame is here shown as comprising the front and rear portions $a$ and $b$ and the front and rear portions or ends of the frame are supported upon axles 11 and 12 which in turn are supported by ground engaging front and rear wheels 13 and 14 respectively.

The vehicle frame is shown as being of open form or construction, having the longitudinal side portions 15 and the front and rear transverse portions 16 and forming a part of the frame and coupling or joining together the front and rear portions $a$ and $b$ is a circular or annular central portion $c$.

Carried by and secured within the central portion $c$ of the vehicle frame is the conical housing 17. This conical housing in addition to having the tapered wall 18, has forming an integral downward extension of such wall, the circular flange or cylinder 19. This depending portion 19 is here shown as fitting within the circular central part $c$ of the vehicle frame structure but it is to be understood that the invention is not limited to this specific construction as it will be obvious that other means may be employed for supporting the conical air housing in a desired manner.

The housing 17 is hollow and is open at the lower part of the cylindrical extension 19 and is also open at its top or apex, as shown. At the top or apex portion of the housing is an outstanding encircling flange 20 which is received in and engaged by a collar 21 which forms a portion of a carry off pipe 22.

Ridigity or stiffness is given to the conical housing 17 by the reenforcing ribs 23 which are disposed vertically along the outer surface thereof, the lower ends of said ribs being joined to the circular portion $c$ of the carriage frame while the upper ends are secured to an encircling reenforcing band 24.

The coupling 20—21 between the upper end of the conical housing and the material carry off pipe 22 is, as will be readily seen, of swivel character whereby the pipe 22 when released from the hereinafter described support, may be turned or swung in a horizontal plane to any desired positon. Normally the pipe 22 extends rearwardly from the upper part of the housing 17 and it is supported in the saddle 25 which is carried upon the upper ends of legs 26, the lower ends of which are secured to the side portions of the rear part $b$ of the carriage. In addition to the legs 26, bracing arms or struts 27 are extended upwardly and rearwardly from housing reenforcing ribs 23 to the underside of the saddle 25 thereby providing additional rigid support for the rear end of the pipe.

Disposed within and coaxially with the housing 17 is the double conical air deflector which is generally designated 28. This air deflector comprises the upper cone portion 29, the apex of which is close to but just below the open upper end of the housing 17, and the inverted frusto-conical lower part 30. These two portions 29 and 30 of the air deflector 28 are secured to a plate 31 which joins the base portions of the two conical parts and such plate is secured to a housing 32 which is disposed within the upper conical body 29 and has joined to the side thereof and opening thereinto, the tubular shaft housing 33 which extends horizontally forwardly through the wall of the outer conical housing 17. Outside the housing 17 the tubular shaft housing 33 is supported upon suitable supports 34.

Extending downwardly from the housing 32 is a tubular shaft housing 35 and the lower end of this housing, which terminates in the lower end of and opens through the frusto-conical housing 30, has secured thereto the rigid supporting arms 36 which pass through the wall of the frusto-conical portion 30 and are rigid with the circular frame portion c of the carriage and the side rails 15 of the carriage forward portion a.

Supported upon the forward portion a of the carriage structure is a suitable prime mover or power unit which is conventionally illustrated and is generally designated 37. Leading rearwardly from this power unit or prime mover is a driving shaft 38 which passes through the tubular housing 33 to the housing 32 where it is coupled with suitable gearing, not shown, which in turn is coupled with a shaft 39 which passes downwardly through the tubular shaft housing 35 and has secured upon its lower end, below the frusto-conical portion 30 of the air deflector, the fan blades 40. These blades are rotated in a plane below the supporting members 36 and they are of a length to substantially equal the radius of the circular cylindrical portion 19 of the conical housing 17, within which they are located. Thus it will be seen that upon rotation of the blades 40 in the proper direction air will be drawn up through the cylindrical lower portion 19 of the housing 17 and forced through the open top end of the housing into the pipe 22.

The base diameter of the conical portion 29 of the air deflector is of a diameter materially less than the inside diameter of the housing 17 in the plane of the plate 31 and accordingly it will be readily seen that there is provided between the wall 18 of the housing 17 and the wall of the conical portion 29, the narrow air passageway 41 through which the air is forced under high velocity by the fan.

In order to increase or decrease the pulling action of the air movement created by the fan blades 40 there is disposed around the cylindrical portion 19 the vertically adjustable skirt 42. This skirt which is preferably of suitable fabric such as belting material or the like, is adjustably secured to the cylindrical portion of the housing by a split band 43 having relatively movable ends 44 which are drawn together by a bolt or other suitable means. This skirt extends down beyond the lower edge of the cylindrical portion 19 and in order to protect it against excessive damage through contact with stones or other objects on the ground it has secured around its lower edge the metal guard ring or band 45.

In order to prevent the accumulation of straw and grasses within the housing 17 around and against the supporting members 36 and the tubular shaft housing 33, a shield means is provided in the form of a cover plate 46 disposed across the undersides of and connecting the support members 36, and the upwardly converging side shield plates 47 which connect between the members 36 and the tubular housing 33 as shown in Figure 3. These plates 46 and 47, of course, extend also forwardly and rearwardly between the inner wall of the housing 17 and the walls of the portions 29 and 30 of the air deflector unit 28.

The plates 46 and 47 have been illustrated as connected to the parts 36 and 33 by welding or some similar means but it will be readily apparent that they may be secured by bolts and screws or in any other desired manner. This applies also to the connections between the plate 31 and the adjacent members 29 and 30. These parts may all be bolted together or they may be welded if desired, bolting or securing together by screws be preferred, however, to facilitate opening the air deflector for access to the gear housing 32.

In the operation of the present machine the same is drawn over a field where wheat has been harvested, during which time the power unit 37 is operated to rotate the fan blades at a high speed. This will create a powerful current of air upwardly through the passage 41, the air being drawn in between the lower edge of the extensible skirt 42 and the surface of the ground. This strong movement of air over the surface of the ground and upwardly through the housing 17 will pick up all heads of grain which may have been knocked loose and dropped during harvesting or grain damaged by insects or wind or lying on the grain field as a result of some other condition. The grain drawn up by the action of the fan will be forced through the top of the housing 27 and into the pipe 22 from which it may be conducted to a suitable receiver such as a truck or other receptacle drawn along behind the pick up mechanism.

The present machine may also be employed for breaking the bloom on legumes such as peas and beans, or alfalfa, for the purpose of increasing the crop by self-fertilization.

I claim:

1. An apparatus for picking up grain from a field, comprising a carriage structure, a vertically disposed conical housing supported on the carriage structure, the lower or base portion of the housing being open and defined by a circular downward extension, the apex portion of the housing being open to provide an outlet, a conduit connected with said outlet, a conical air deflector within the housing and spaced from the wall thereof, a fan supported from said air deflector and disposed beneath the same for rotation on a vertical axis, the fan having blades arranged to draw air in through the lower part of the housing and force it upwardly around the deflector to said outlet, and means connected with the fan for rotating the fan.

2. An apparatus of the character stated in claim 1, with a flexible skirt encircling the said circular lower portion of the housing and extending downwardly below such circular lower portion, means securing the skirt whereby the skirt may be adjusted vertically with respect to the underlying surface of the ground.

3. An apparatus of the character stated in claim 1, with a flexible skirt encircling the said circular lower portion of the housing and extending downwardly below such circular lower portion, means securing the skirt whereby the skirt may be adjusted vertically with respect to the underlying surface of the ground, and a wear ring secured around the lower edge of the skirt.

4. An apparatus for picking up grain from a field, comprising a carriage structure, a vertically disposed conical housing carried by the carriage structure, the housing having the lower or base portion continued downwardly by a cylindrical extension, the lower or base portion of the housing being open and the top of the housing having an outlet opening, a conduit connected with said outlet opening, a double conical deflector disposed within and coaxially of the first mentioned housing, the air deflector comprising an upper conical portion having its wall in spaced parallel relation with the housing wall and a lower frusto-conical portion, the deflector portions having the bases thereof in opposed joined relation and of the same diameter, a prime mover carried by the carriage, a shaft extending from the prime mover through the first mentioned housing and into the air deflector, a second shaft extending downwardly centrally of the air deflector and through the center of the frusto-conical portion, said shafts being coupled together for unitary rotation, fan blades carried upon the lower end of the second shaft to rotate within the cylindrical extension of the first housing whereby to draw air upwardly through the first housing for discharge through the outlet thereof, the first mentioned shaft passing across the space between the first mentioned housing and the upper conical portion of the air deflector, and a shield means extending downwardly from the first mentioned shaft in said space for preventing accumulation of picked up material in the first housing around the first mentioned shaft.

5. A grain pick up apparatus of the character stated in claim 4, with a skirt secured to the circular lower portion of the first mentioned housing and extending downwardly therefrom, the skirt being of a flexible character, and means securing the skirt to the circular portion of the first housing whereby the skirt may be maintained in vertically adjusted position with respect to the underlying surface of the ground.

6. A machine of the character described for picking up fallen grain heads from a field, comprising a wheeled carriage, a vertically disposed hollow housing supported by the carriage, the housing being of gradually decreasing internal size from the lower part to the top thereof, the lower part of the housing being open and arranged to move in close proximity to and over the surface of the ground, the upper part of the housing having an outlet, a fan rotatably supported in the lower part of the housing for rotation on a vertical axis and having blades arranged, when turned in one direction, to draw air in through the lower part of the housing and force it out through the top opening, means for rotating the fan, a conduit connected with the outlet of the housing for carrying off picked up grain to a receiver, and a flexible skirt secured to the perimeter of and encircling the lower part of the housing and adapted to be adjusted vertically to increase or decrease the height of the air admission space between the lower part of the housing and the ground.

VERNON W. FLEMING.

REFERENCES CITED

The following references are of record in the file of this patent:

UNITED STATES PATENTS

| Number | Name | Date |
|---|---|---|
| D. 153,673 | Elliotte | May 10, 1949 |
| 514,677 | Furnas | Feb. 13, 1894 |
| 923,649 | Hamilton | June 1, 1909 |
| 1,078,468 | Sumwalt | Apr. 11, 1913 |
| 1,272,665 | Isom | July 16, 1918 |
| 2,065,721 | Mutzbauer | Dec. 29, 1936 |
| 2,105,803 | Barnes | Jan. 18, 1938 |
| 2,231,352 | Shoemaker | Feb. 11, 1941 |